Patented Dec. 29, 1931

1,838,949

UNITED STATES PATENT OFFICE

HERBERT T. LEO, CLARENCE C. TAYLOR, AND FREDERICK A. BECK, OF LOS ANGELES, CALIFORNIA

PECTOUS MATERIAL AND PROCESS OF MAKING THE SAME

No Drawing. Application filed October 1, 1927. Serial No. 223,482.

This invention relates to pectous material and to a process of making the same.

It is an object of this invention to provide a method of making a pectous material embodying the pectins and fibers of fruits and vegetables, wherein the fibers are of a colloidal size and the pectin is water soluble, the two being formed into a homogeneous mixture adapted for use in making jams, jellies and confections and as a substitute for valuable gums of commerce.

It is a further object of this invention to provide a pectous fiber containing material in which the fiber is so finely divided that it is not apparent in a finished jelly or jam made from the material, the material thereby being suitable for use in the making of jams and jelly, for thickening ice cream, for preparing emulsions of oils in water, for the preparation of substitutes for gum, such as tragacanth, India and Acacia, as a protecting colloid and as an ingredient in the preparation of meringues and marshmallows.

It is a further object of this invention to provide pectous material containing fruit fiber of colloidal size and a pectin in water soluble form adapted to go into solution without requiring the presence of free acids.

It is a further object of this invention to provide a pectous material containing fiber in such condition that it will absorb water to a high degree and produce a practically homogeneous colloidal solution.

A further object of this invention is to provide a method for preparing a pectous fiber containing material in dry powdered form, the degree of fineness of the ingredients being such that the rate of solubility is materially increased.

Other and further important objects of this invention will become apparent from the following description and appended claims.

As is well known, many fruits and vegetables contain fibrous material, pectous bodies, sugars, and other extractive substances, together with gums, salts, enzymes and acids. The pectin bodies are in general in an insoluble form, but to a small degree become soluble when the fruit ripens, due to the action of the acids present. However, in the citrous fruits where the acid content is high, the pectous materials are largely separated from the acid by intercellular material and are protected by the salts commonly present in the fruits to such a degree that they remain insoluble in water and can be rendered soluble only by subjection to acid solutions of high hydrogen ion concentrations or high temperatures.

We have discovered that the presence of mineral salts reduces the hydrogen ion concentration to a large extent, thereby protecting the pectous bodies from hydrolysis. It is therefore desirable, as a step in our process, to remove these soluble salts before processing the fruit and to provide for their elimination in the end product to as great an extent as possible.

Although our process as set forth hereinafter is applicable to all fruits and vegetables containing pectous material, we prefer to use our process in connection with citrous fruits on account of the high ratio of pectin to fiber that exists therein and on account of the absence of sugar and starch in citrous fruits. This ratio may run as high as 40% in citrous fruits, whereas in apples it is as low as 15%. We have also determined that the pectins in citrous fruits possess higher jell values.

Before the pectous bodies in the fruits or vegetables become soluble pectins, they must be subjected to hydrolysis, resulting from the action of free hydrogen ions. While it is desirable to have the hydrogen ion concentration sufficient that the reaction may take place rapidly, the time of treatment should be so governed that the pectins are not subjected to excessive action, or they will be progressively destroyed. It is also desirable to have the hydrogen ion concentration sufficiently high to make the process efficient and too high to make jellies, since the hydrogen ion concentration necessary for satisfactory extraction of pectin from pectous containing material is much higher than that necessary to give the desirable acidity for making jells. In fact, the pH value of the acid solution used in the extraction of pectin should be approximately 1.23, while that required for making a good jelly is about 2.34. An important step in this process therefore includes the reduction of the hydrogen ion concentration as soon as the pectin is substantially in solution to approximately that required in jelly making, namely between 2.0 and 3.5, and the formation of the final product substantially free of acidity.

Without limiting our invention to any particular procedure, the following description will illustrate our preferred mode of operation:

As applied to citrous fruit and more particularly lemons, the fruit is first squeezed to express the greatest possible amount of the natural juices contained therein. The remaining fruit pulp is then disintegrated or comminuted to a very fine degree, breaking up as many of the fruit cells as is possible to expose them to the subsequent washing operation. This step will facilitate the washing away of the fruit salts and other materials, such as enzymes, fruit gums and acids. The pulp is then subjected to a thorough water washing and drained free from excess water.

Water is next added to the pulp and sufficient acid introduced to produce pH value of approximately 1.23, hydrochloric acid being preferably used. It will be understood, however, that any acid will be satisfactory that is capable of bringing the pH value to the desired point. The mass is then brought to a temperature near its boiling point to hasten reaction, whereupon the pulpy material will quickly thicken as the pectin goes into solution. The time required to obtain complete reaction seldom exceeds 20 minutes.

After the pectins are dissolved, a solution of a buffer salt, such as the salt of a weak acid and strong base, preferably sodium citrate or acetate is added to reduce the hydrogen ion concentration to such a degree that no further injury to the pectin will result.

The pulp is now run through a fine sieve to remove the seeds and any undigested fibers. It is now important to break up the fibers in the thick mass to colloidal size and for this purpose any suitable homogenizer or viscolizer may be employed. This step is important for the reason that the fineness of the fiber determines the satisfactory qualities for the uses above specified. Although it is preferable to market a dry material, for some purposes it may be used in the wet form.

If desired to produce a dry product, the whole mass is precipitated by any well known method, preferably by using alcohol, since alcohol washes out reaction products undesirable in the finished product and since it requires the minimum number of steps to produce the end product. The mass is then dried in any convenient apparatus and ground to a degree satisfactory for attaining rapid solution of the pectin in its subsequent use.

In its final form, the dry pectous product comprises a homogeneous mixture of water soluble pectin and fibrous material of colloidal size. Such material is very satisfactory for use in making of jams and jellies and for the purposes above set forth.

By the term "water soluble" is meant that the pectin present in the product is capable of readily and quickly dissolving in an excess quantity of boiling water, say inside of one minute, without any acid present. Dry pectin as generally prepared without previous hydrolysis, on the other hand, is insoluble in water under boiling temperature and requires a boiling period of one hour or more in an acid solution having a pH value of 2.34 to put it into solution. The decided advantage possessed by our product over the usual dry pectin compositions is therefore apparent.

We are aware that many changes may be made, and numerous details of the process may be varied through a wide range without departing from the principles of this invention, and we therefore do not purpose limiting the patent granted hereon, otherwise than necessitated by the prior art.

We claim as our invention:

1. The process of making pectous material, which comprises removing the bulk of the natural juices from a fruit or vegetable, comminuting the remaining pulp, washing the pulp with water, acidifying and heating to dissolve the pectin, screening to remove seeds and undigested fibrous material and homogenizing the screened product.

2. The process of making pectous material, which comprises removing the bulk of the natural juices from a fruit or vegetable, comminuting the remaining pulp, washing the pulp with water, acidifying and heating to dissolve the pectin, screening to remove seeds and undigested fibrous material, homogenizing the screened product, precipitating the pectin and digested fibers from the screened product, drying the precipitated mass and grinding to a finely divided homogeneous product.

3. In the process of making pectous material, the steps of acidifying and heating a finely comminuted pulp of a citrous fruit to dissolve the pectin, screening to remove seeds and undigested fibrous material and homogenizing the screened product consisting of digested fibers and pectin to obtain the fibers in a colloidal size.

4. The process of making pectous material from citrus fruits, which comprises removing the bulk of the natural juices from the fruit, finely dividing the remaining fruit pulp, washing the fruit pulp with water to remove fruit salts, enzymes, gums and acids, adding water and sufficient acid to the washed pulp to produce a pH value of substantially 1.23, heating to near the boiling point to dissolve the pectin, protecting the pectin against decomposition and organic changes by reducing the hydrogen ion concentration, passing the pulp through a fine sieve to remove seeds and undigested fibers, homogenizing the sieved mass to colloidal proportions, precipitating the mass with alcohol, drying and grinding the precipitated mass containing pectin and fibrous material.

5. As a new article of manufacture, a pectous product containing fibrous material of colloidal proportions and a water soluble pectin.

6. In the process of making pectous material, the steps which include acidifying a finely comminuted pulp of a fruit or vegetable, heating to dissolve pectous material contained in the pulp and to digest the pulp fibers and homogenizing the resulting mass to reduce the fibers to colloidal size and form a homogeneous mixture of pectous and digested fibrous material.

7. In the process of making pectous material, the steps which include acidifying a finely comminuted pulp of a fruit or vegetable, heating to dissolve pectous material contained in the pulp and to digest the pulp fibers, homogenizing the resulting mass to reduce the fibers to colloidal size and form a homogeneous mixture of pectous and digested fibrous material, precipitating the mixture, drying and grinding the precipitated mixture.

8. In the process of preparing pectous material suitable for jelly making, the steps which include acidifying an aqueous mixture of finely comminuted fruit pulp containing pectin and fibrous material to obtain a pH value of approximately 1.23, heating the mixture to dissolve the pectin and digest the fibrous material, as soon as dissolution of the pectin is complete adding to the mixture a buffer salt to reduce the hydrogen ion concentration below that detrimental to pectin, screening the mixture to remove undigested fibrous material and homogenizing the screened mixture to obtain an aqueous solution of pectin containing fibrous material in a substantially colloidal state.

9. In the process of preparing pectous material suitable for jelly making, the steps which include acidifying an aqueous mixture of finely comminuted fruit pulp containing pectin and fibrous material to obtain a pH value of approximately 1.23, heating the mixture to dissolve the pectin and digest the fibrous material, as soon as dissolution of the pectin is complete adding to the mixture a buffer salt to increase the pH value to between 2.0 and 3.5, screening the mixture to remove undigested fibrous material and homogenizing the screened mixture to obtain an aqueous solution of pectin containing fibrous material in a substantially colloidal state.

In testimony whereof, we have hereunto subscribed our names.

HERBERT T. LEO.
CLARENCE C. TAYLOR.
FREDERICK A. BECK.